(12) United States Patent
Fujii (10) Patent No.: US 11,323,584 B2
(45) Date of Patent: May 3, 2022

(54) INFORMATION PROCESSING APPARATUS CAPABLE OF SHARING SETTINGS FOR IDENTICAL FUNCTIONS BETWEEN DIFFERENT APPLICATIONS AND NON-TRANSITORY COMPUTER READABLE MEDIUM

(71) Applicant: FUJIFILM Business Innovation Corp., Tokyo (JP)

(72) Inventor: Masaru Fujii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 214 days.

(21) Appl. No.: 16/515,034

(22) Filed: Jul. 18, 2019

(65) Prior Publication Data
US 2020/0036840 A1  Jan. 30, 2020

(30) Foreign Application Priority Data
Jul. 25, 2018  (JP) .............................. JP2018-139420

(51) Int. Cl.
*H04N 1/00*  (2006.01)

(52) U.S. Cl.
CPC ....... *H04N 1/0097* (2013.01); *H04N 1/00517* (2013.01); *H04N 1/00822* (2013.01)

(58) Field of Classification Search
None
See application file for complete search history.

(56) References Cited

U.S. PATENT DOCUMENTS

2010/0067035 A1 * 3/2010 Kawakubo ............ G06F 3/1253
                                                                    358/1.13
2018/0101668 A1 * 4/2018 Satoh .................... H04L 63/102

FOREIGN PATENT DOCUMENTS

JP        2008-269632        11/2008

* cited by examiner

*Primary Examiner* — Andrew H Lam
(74) *Attorney, Agent, or Firm* — JCIPRNET (57) ABSTRACT

An information processing apparatus includes an identifying unit, an acquiring unit, and an applying unit. The identifying unit identifies an unset function from functions included in an activated first application. The acquiring unit acquires setting information for the identified function in a second application different from the first application. The applying unit applies the acquired setting information to the function of the first application.

10 Claims, 12 Drawing Sheets

| U01 | | | 2212 |
|---|---|---|---|
| No. | TIME | APPLICATION NAME | FUNCTION NAME OF EXECUTED FUNCTION |
| ... | ... | ... | ... |
| #501 | 06/09/2018 10:31 | ScanToFTP | TWO-DIMENSIONAL BAR-CODE READING REGION |
| #502 | 06/09/2018 11:45 | ScanToCloud | TWO-DIMENSIONAL-CODE READ COORDINATES, FORWARD |
| #503 | 06/09/2018 15:00 | ScanToCloud | TWO-DIMENSIONAL-CODE READ COORDINATES, FORWARD |
| ... | ... | ... | ... |

| U01 | | | 2212 |
|---|---|---|---|
| No. | TIME | APPLICATION NAME | FUNCTION NAME OF EXECUTED FUNCTION |
| ... | ... | ... | ... |
| #501 | 06/09/2018 10:31 | ScanToFTP | TWO-DIMENSIONAL BAR-CODE READING REGION |
| #502 | 06/09/2018 11:45 | ScanToCloud | TWO-DIMENSIONAL-CODE READ COORDINATES, FORWARD |
| #503 | 06/09/2018 15:00 | ScanToCloud | TWO-DIMENSIONAL-CODE READ COORDINATES, FORWARD |
| ... | ... | ... | ... |

| ELEMENT ID | GROUP | ELEMENT NAME | RELATED CHARACTER STRING |
|---|---|---|---|
| F11 | SERVICE | COPY | READ, SCAN, OUTPUT, PRINT |
| F12 | SERVICE | PRINT | OUTPUT, PRINT |
| F13 | SERVICE | FAX | READ, SCAN, OUTPUT, PRINT |
| F14 | SERVICE | SCAN | READ, SCAN |
| F15 | TONE | COLOR DESIGNATION | COLOR, TONE |
| F16 | OPTION | STAPLER | STAPLER, BOOKBINDING, BOOKLET |
| F17 | OPTION | HOLE PUNCHER | HOLE PUNCHER, BOOKBINDING, BOOKLET |
| ... | ... | ... | ... |
| F21 | ANALYSIS | ONE-DIMENSIONAL CODE ANALYSIS | BAR CODE, ONE-DIMENSIONAL CODE |
| F22 | ANALYSIS | TWO-DIMENSIONAL CODE ANALYSIS | TWO-DIMENSIONAL CODE, TWO-DIMENSIONAL BAR CODE |
| F23 | ANALYSIS | READ REGION DESIGNATION | COORDINATES, POSITION, REGION, ZONE |
| ... | ... | ... | ... |

| APPLICATION NAME | FUNCTION NAME | U01 | U02 | ... |
|---|---|---|---|---|
| XYZScanV5 | SCAN RESOLUTION | 200 dpi | 100 dpi | ... |
| XYZScanV5 | SCAN COLOR | FULL COLOR | FULL COLOR | ... |
| XYZScanV5 | AUTOMATIC TILT CORRECTION | ON | OFF | ... |
| XYZScanV5 | 2-DIMENSIONAL-CODE READ POSITION | (UNSET) | (UNSET) | ... |
| XYZScanV5 | ... | ... | ... | ... |
| ABCPrint | OUTPUT COLOR | FULL COLOR | FULL COLOR | ... |
| ABCPrint | ... | ... | ... | ... |
| ScanToFTP | ... | ... | ... | ... |
| ScanToCloud | TWO-DIMENSIONAL-CODE READ COORDINATES | READ/NO-READ: | (UNSET) | ... |
| ScanToCloud | ... | ... | ... | ... |

INFORMATION PROCESSING APPARATUS CAPABLE OF SHARING SETTINGS FOR IDENTICAL FUNCTIONS BETWEEN DIFFERENT APPLICATIONS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-139420 filed Jul. 25, 2018.

BACKGROUND (i) Technical Field

The present disclosure relates to information processing apparatuses and non-transitory computer readable media.

(ii) Related Art

A setting process for achieving user-friendliness of an application program (referred to as "application" hereinafter) to be activated in an information processing apparatus is normally performed for each application. As a method for assisting with an application installation process, for example, Japanese Unexamined Patent Application Publication No. 2008-269632 discloses a workflow-creation assistance method of creating a new workflow by inheriting set values of setting items in a new version of the application from set values of setting items in an old version of the application during an installation process.

SUMMARY

Aspects of non-limiting embodiments of the present disclosure relate to sharing settings for identical functions between different applications.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including an identifying unit, an acquiring unit, and an applying unit. The identifying unit identifies an unset function from functions included in an activated first application. The acquiring unit acquires setting information for the identified function in a second application different from the first application. The applying unit applies the acquired setting information to the function of the first application.

BRIEF DESCRIPTION OF THE DRAWINGS

An exemplary embodiment of the present disclosure will be described in detail based on the following figures, wherein.

DETAILED DESCRIPTION

Exemplary Embodiment

Overall Configuration of Information Processing System

Figure 1:
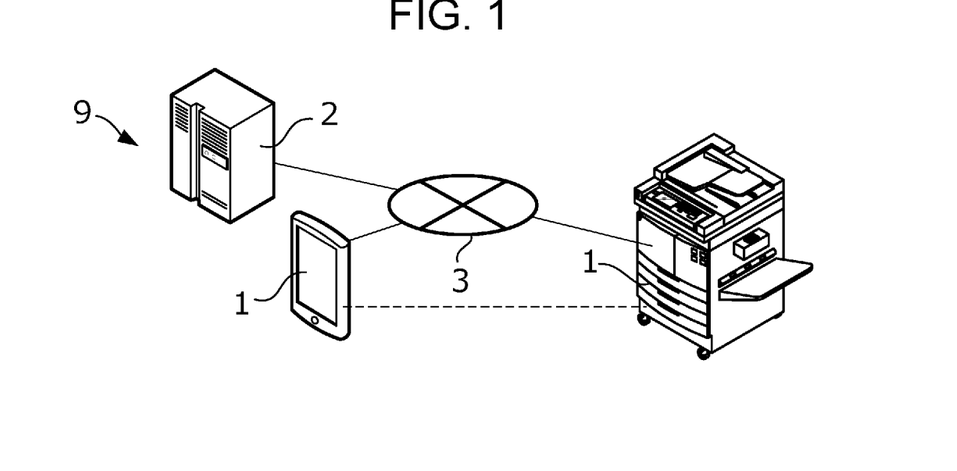
FIG. 1 illustrates the configuration of an information processing system according to an exemplary embodiment.

FIG. 1 illustrates the configuration of an information processing system 9 according to an exemplary embodiment. The information processing system 9 includes multiple information processing apparatuses 1, a server apparatus 2, and a communication line 3 that connects these apparatuses in a communicable manner.

Each information processing apparatus 1 is a stationary terminal apparatus that a user uses by activating an application. In addition to a stationary terminal apparatus, the information processing apparatuses 1 may include a portable terminal apparatus for operating the stationary terminal apparatus. The server apparatus 2 connects with the information processing apparatuses 1 via the communication line 3 and manages the history of functions of applications executed in the information processing apparatuses 1.

The communication line 3 may be, for example, a local area network (LAN), a wide area network (WAN), the Internet, or a combination of these networks. Moreover, the communication line 3 may include a public switched telephone network (PSTN) or an integrated service digital network (ISDN).

Configuration of Server Apparatus

Figure 2:
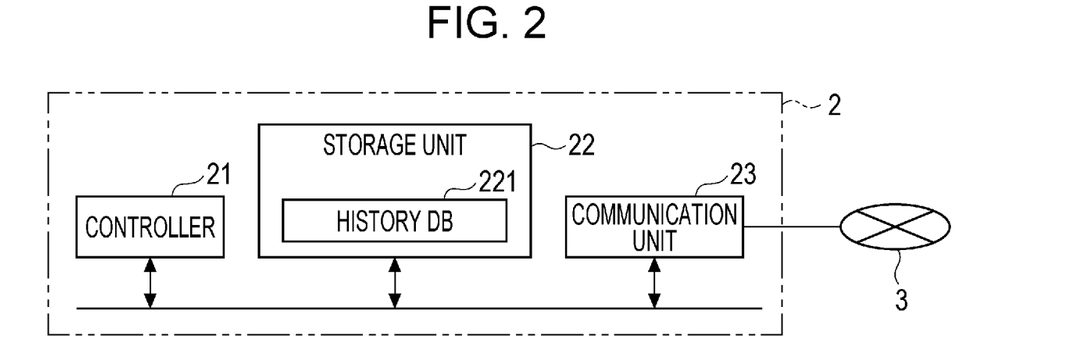
FIG. 2 illustrates the configuration of a server apparatus.

FIG. 2 illustrates the configuration of the server apparatus 2. As shown in FIG. 2, the server apparatus 2 includes a controller 21, a storage unit 22, and a communication unit 23.

The controller 21 includes a central processing unit (CPU), a read-only memory (ROM), and a random access memory (RAM). The CPU reads and executes a computer program (simply referred to as "program" hereinafter) stored in the ROM or the storage unit 22 so as to control each unit of the server apparatus 2.

The communication unit 23 is a communication circuit that connects with the communication line 3 in a wired or wireless manner. The server apparatus 2 uses the communication unit 23 to exchange information with the information processing apparatuses 1 connected to the communication line 3.

The storage unit 22 is, for example, a hard disk drive and stores various types of programs and data to be read by the CPU of the controller 21. The storage unit 22 also stores a history database (DB) 221.

Configuration of History DB

Figure 3:
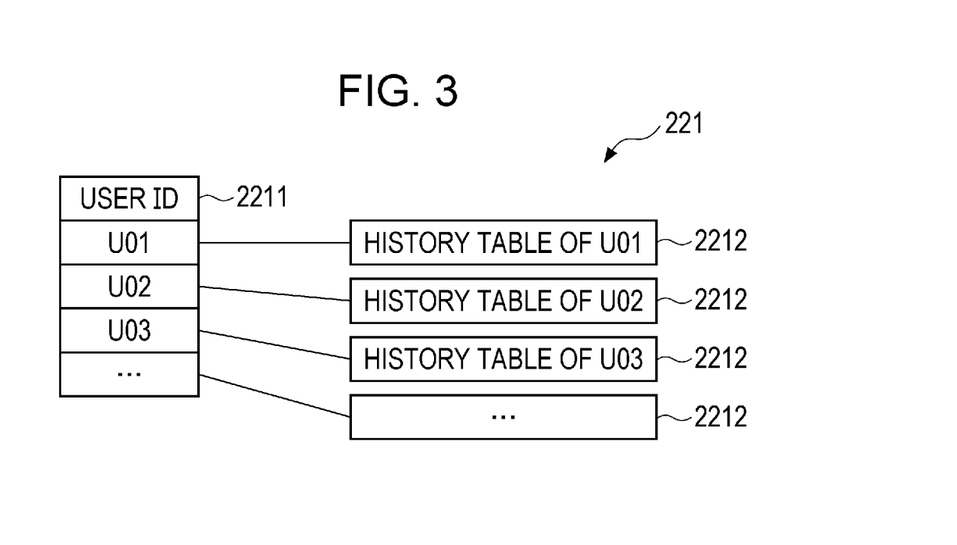
FIG. 3 illustrates an example of a history database stored in a storage unit.

FIG. 3 illustrates an example of the history DB 221 stored in the storage unit 22. The history DB 221 shown in FIG. 3 is a database that contains the history of functions of applications executed in the information processing apparatuses 1. The history DB 221 includes a user ID list 2211 and a history table 2212. The user ID list 2211 contains user IDs as identification information of users operating the information processing apparatuses 1. The history table 2212 is provided for each user ID and contains the history of functions of applications executed in the corresponding information processing apparatus 1 by the user identified based on the relevant user ID.

Figure 4:
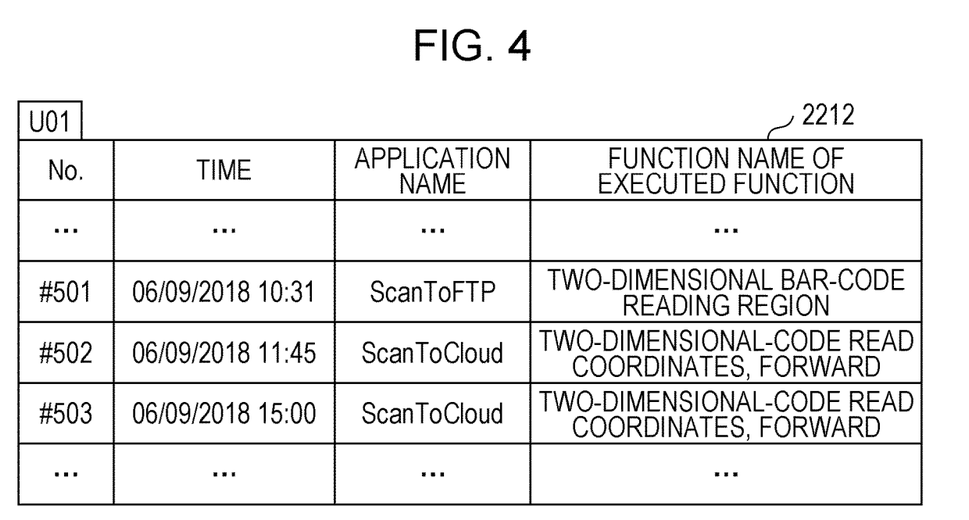
FIG. 4 illustrates an example of a history table.

FIG. 4 illustrates an example of the history table 2212. Each stored piece of history is a set of time and date on which a function is executed, an application name, and a name of a function (also referred to as "function name"). The example of the history table 2212 shown in FIG. 4 indicates the history of functions of applications executed in the corresponding information processing apparatus 1 by a user with a user ID "U01". For example, with regard to the history number "#501", a function with a function name "two-dimensional bar-code reading region" of an application name "ScanToFTP" has been executed by the user "U01" at "10:31 on Jun. 9, 2018".

The history DB 221 may also contain the history of the aforementioned function together with the identification information of the information processing apparatus 1 where the function is executed. For example, the user ID list 2211 may contain sets of user IDs and identification information of the information processing apparatuses 1, and the history table 2212 may be stored for each of these sets. Moreover, the history table 2212 may be provided with a field that indicates the identification information of each information processing apparatus 1.

Configuration of Information Processing Apparatus

Figure 5:
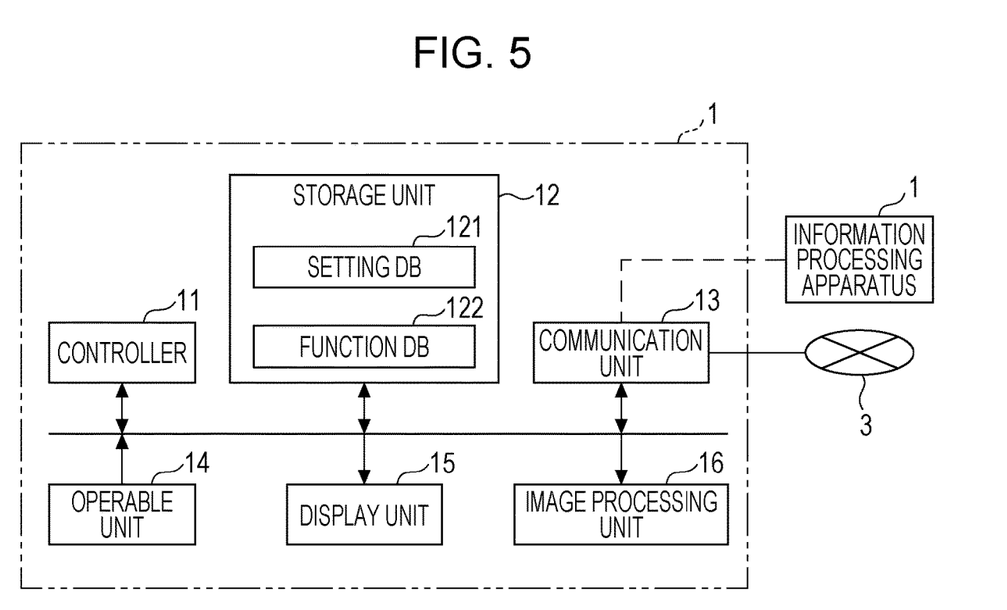
FIG. 5 illustrates the configuration of an information processing apparatus.

FIG. 5 illustrates the configuration of each information processing apparatus 1. The information processing apparatus 1 shown in FIG. 5 includes a controller 11, a storage unit 12, a communication unit 13, an operable unit 14, a display unit 15, and an image processing unit 16. The information processing apparatus 1 has functions for forming, reading, and transmitting an image.

In a case where the information processing apparatus 1 is, for example, a terminal apparatus that operates another stationary information processing apparatus 1 via the communication line 3 or via near-field communication, the information processing apparatus 1 does not have to include the image processing unit 16.

The controller 11 includes a CPU, a ROM, and a RAM. The CPU reads and executes a program stored in the ROM or the storage unit 12 so as to control each unit of the information processing apparatus 1.

The communication unit 13 is a communication circuit that connects with the communication line 3 in a wired or wireless manner. The information processing apparatus 1 uses the communication unit 13 to exchange information with another information processing apparatus 1 connected to the communication line 3. The communication unit 13 may also have a near-field communication function. The information processing apparatus 1 shown in FIG. 5 exchanges information with another information processing apparatus 1 via near-field communication, as indicated by a dashed line.

The operable unit 14 includes operators, such as an operable button, a keyboard, and/or a touchscreen, for giving various types of commands, receives an operation performed by the user, and transmits a signal according to the contents of the operation to the controller 11.

When the operable unit 14 receives the operation from the user, the controller 11 of the information processing apparatus 1 supplies operational information indicating the operation to the server apparatus 2 via the communication unit 13 and the communication line 3. Furthermore, when a function of an application is executed in accordance with the operation performed by the user, the controller 11 supplies information indicating the executed time and date, the application name of the application, and the function name of the function to the server apparatus 2.

The display unit 15 has a display screen, such as a liquid crystal display, and displays an image under the control of the controller 11. A transparent touchscreen of the operable unit 14 may be disposed over the display screen.

Under the control of the controller 11, the image processing unit 16 forms an image onto a medium, such as paper, reads the image formed on the medium, and transmits image data indicating the image. The controller 11 causes the image processing unit 16 to perform the above-described process in accordance with, for example, a function of an application activated by the user.

The storage unit 12 is, for example, a solid state drive or a hard disk drive, and stores various types of programs and data to be read into the CPU of the controller 11. Moreover, the storage unit 12 stores a setting DB 121 and a function DB 122.

Configuration of Setting DB

Figure 6:
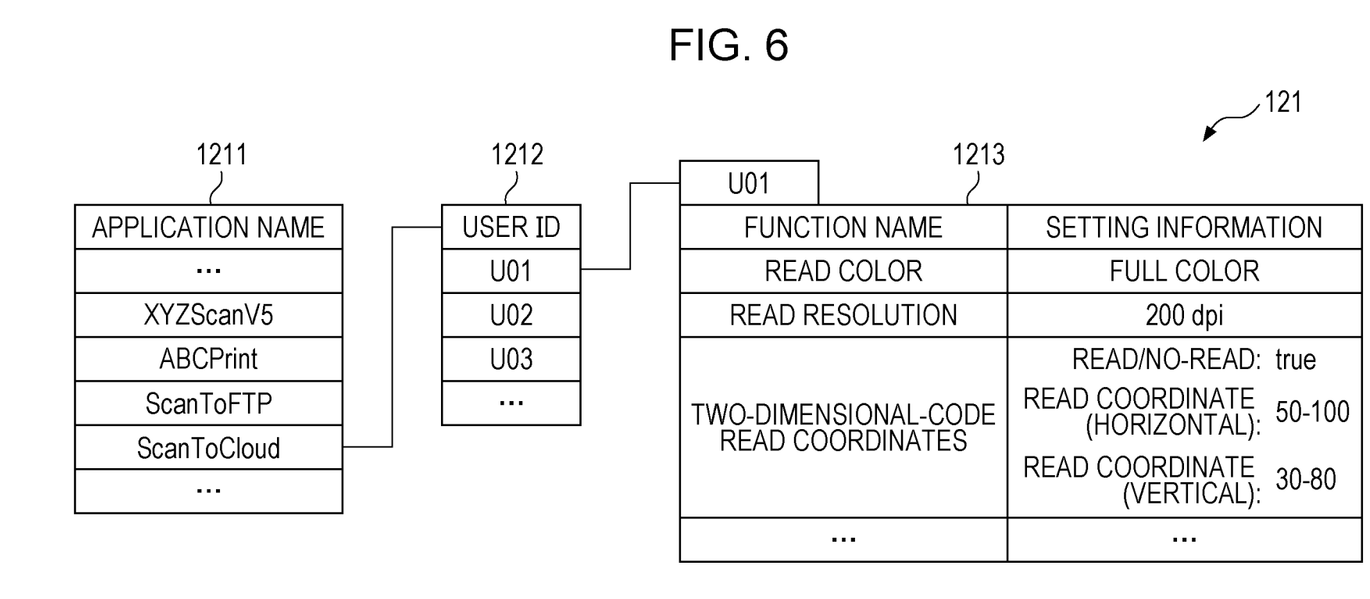
FIG. 6 illustrates an example of a setting database stored in a storage unit.

FIG. 6 illustrates an example of the setting DB 121 stored in the storage unit 12. The setting DB 121 is a database in which user setting information is stored for each function to be executed by an application. The setting DB 121 shown in FIG. 6 includes an application name list 1211, a user ID list 1212, and a setting table 1213.

The application name list 1211 is a list containing application names of applications. The user ID list 1212 is a list containing user IDs as user identification information. The setting table 1213 is a table in which user setting information for each function included in an application is stored for each application and for each user.

In the example of the setting DB 121 shown in FIG. 6, the user settings indicated by the user ID "U01" for an application indicated by an application name "ScanToCloud" include setting information for a function indicated by "two-dimensional-code read coordinates". This setting information indicates "read/no-read: true", "read coordinate (horizontal): 50-100", and "read coordinate (vertical): 30-80", and is constituted of a tuple of three set values. With regard to each of these set values, for example, information indicated by a character string following a colon ":" is used, whereas information indicated by a character string prior to the colon ":" may be neglected.

When any of functions of an application is not set, data indicating that the function is not set is stored in the setting information associated with the function in the setting table 1213 of the setting DB 121.

Configuration of Function DB

Figure 7:
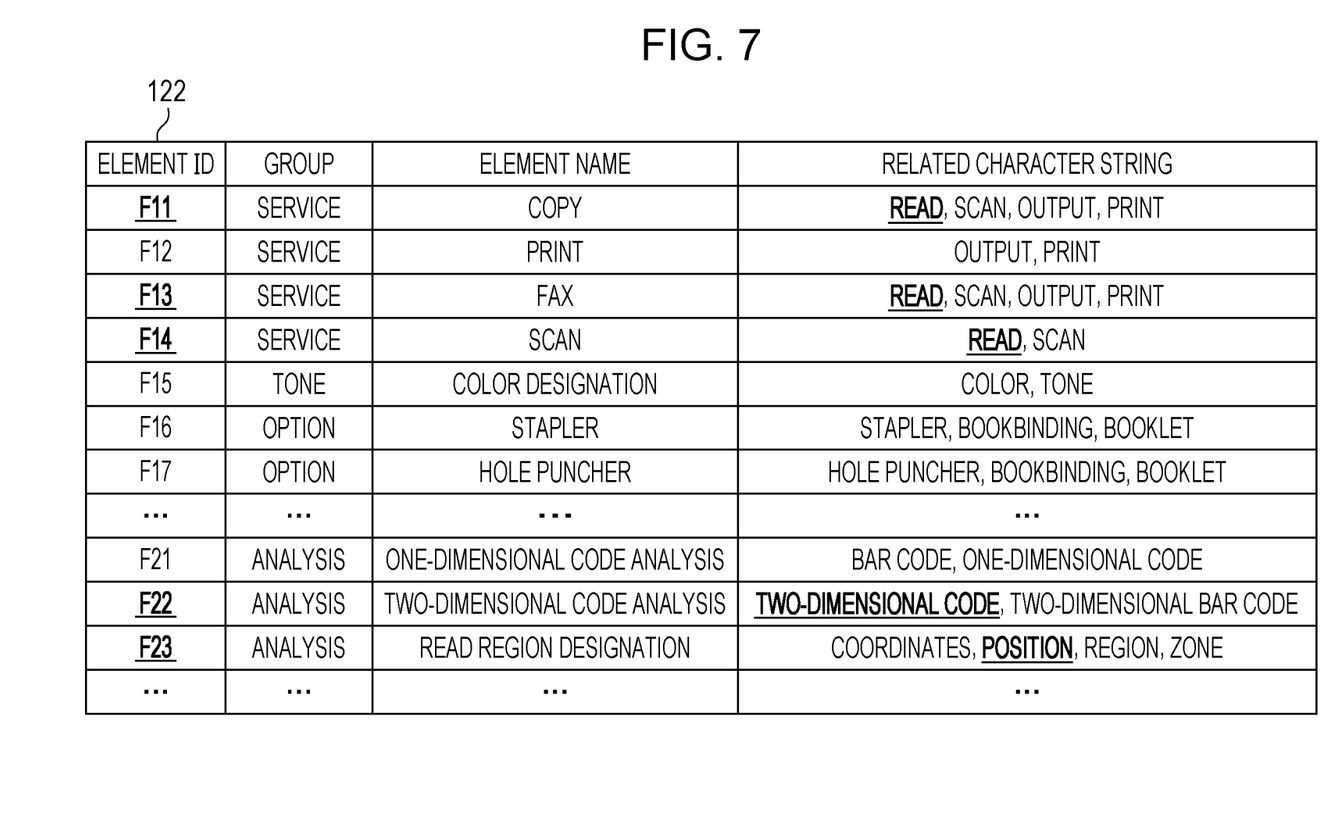
FIG. 7 illustrates an example of a function database stored in the storage unit.

FIG. 7 illustrates an example of the function DB 122 stored in the storage unit 12. The function DB 122 is a database in which a function is disintegrated for each element included in the function and in which each element and a character string related to that element are associated with each other. The function DB 122 shown in FIG. 7 is a table including four fields, namely, an element ID as element identification information, a group to which the element belongs, an element name as the name of the element, and a character string related to the element.

In the example of the function DB 122 shown in FIG. 7, a character string related to an element identified based on an element ID "F11" indicates "read, scan, output, print". A character string related to an element identified based on an element ID "F23" indicates "coordinates, position, region, zone".

Functional Configuration of Information Processing Apparatus

Figure 8:
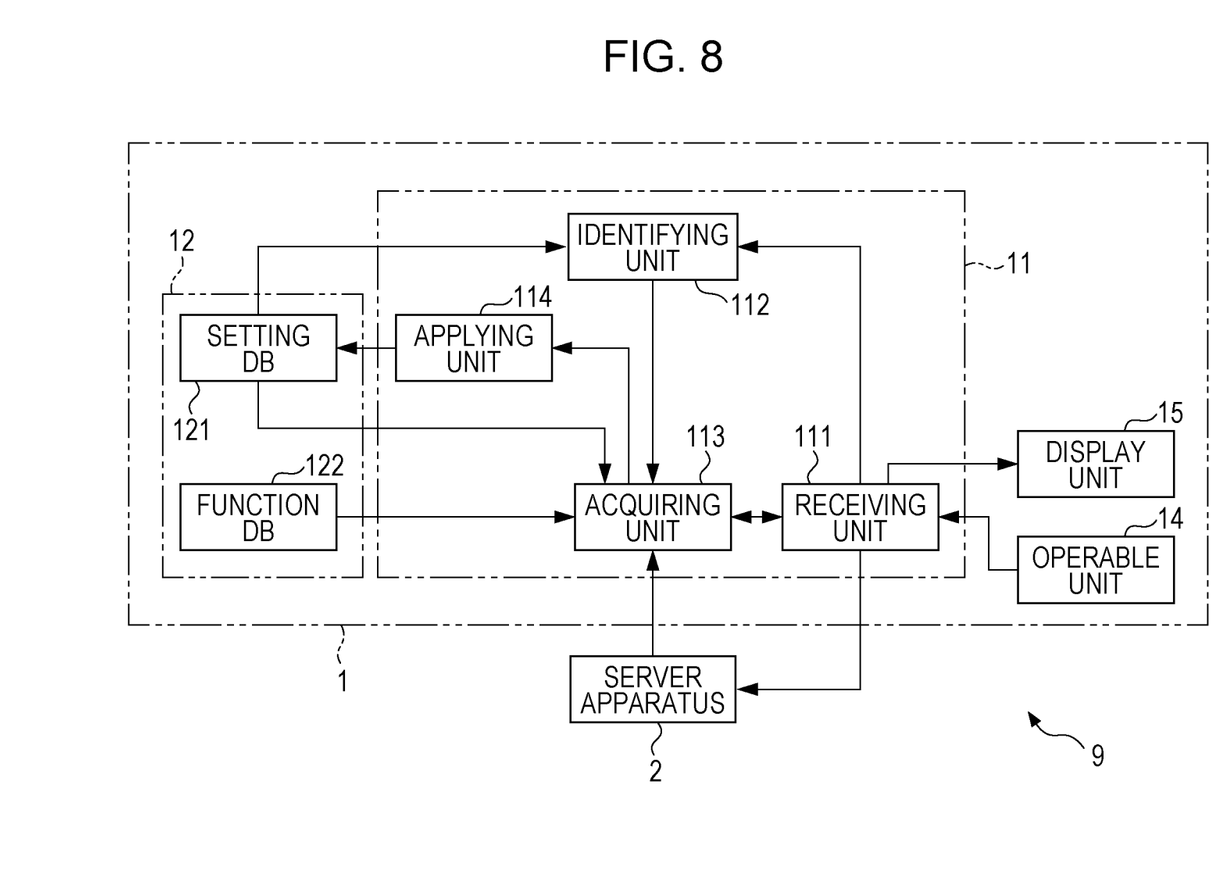
FIG. 8 illustrates a functional configuration of the information processing apparatus.

FIG. 8 illustrates a functional configuration of each information processing apparatus 1. In FIG. 8, the communication unit 13 of the information processing apparatus 1, the communication line 3, and the components of the server apparatus 2 are not shown.

The controller 11 of the information processing apparatus 1 reads and executes a program stored in the storage unit 12 so as to function as a receiving unit 111, an identifying unit 112, an acquiring unit 113, and an applying unit 114.

The receiving unit 111 receives a user operation from the operable unit 14. When a function of an application is executed in the information processing apparatus 1, the receiving unit 111 transmits the history of the function of the application to the server apparatus 2 and causes the server apparatus 2 to store the history.

When the operation received by the receiving unit 111 is an operation for causing the information processing apparatus 1 to activate one of the applications, the identifying unit 112 identifies the application (referred to as "first application").

Then, the identifying unit 112 refers to the setting DB 121 and identifies an unset function from the functions of the identified first application based on, for example, a function name indicating the function. In other words, from the functions included in the activated first application, the identifying unit 112 identifies a function that is not set.

Figure 9:
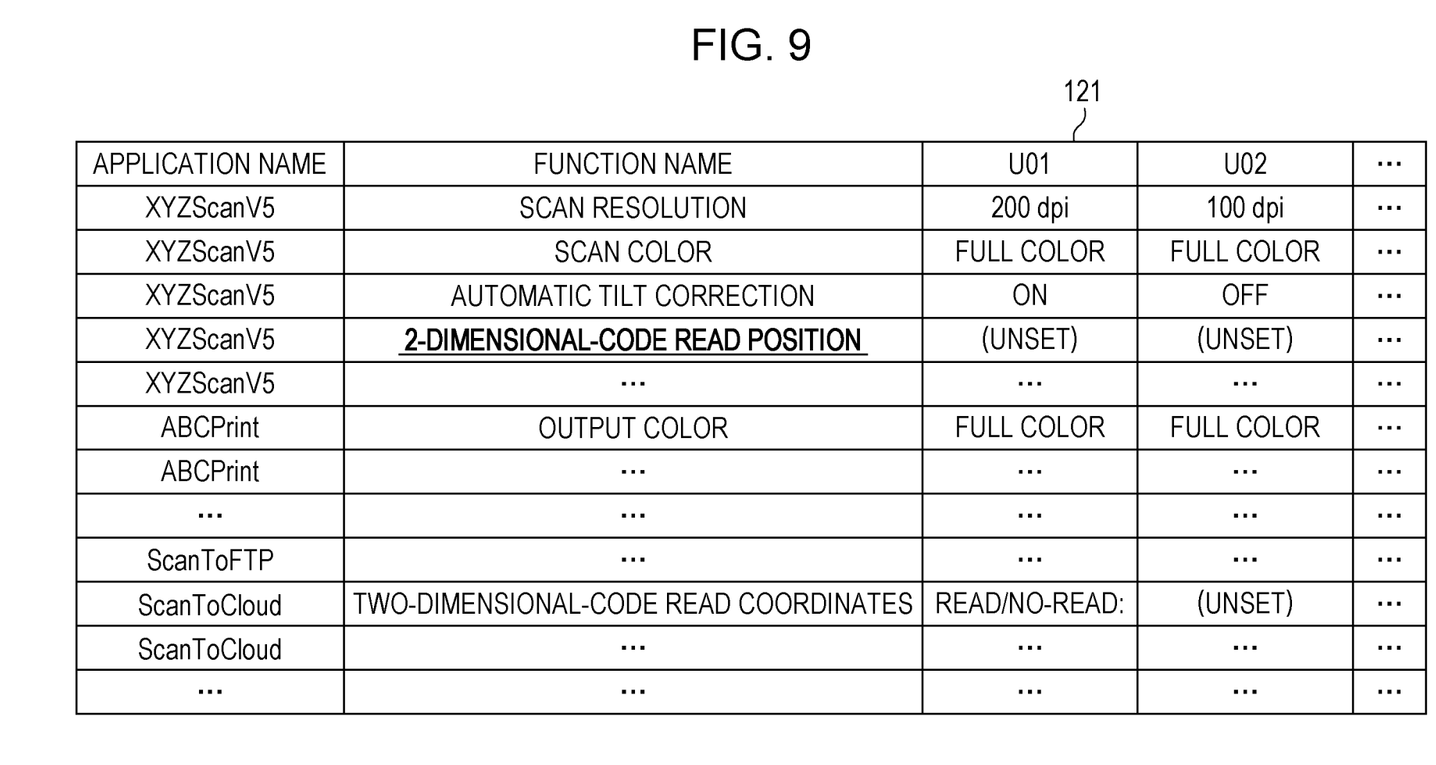
FIG. 9 illustrates the setting database in the form of a table.

FIG. 9 illustrates the setting DB 121 in the form of a table. When the identifying unit 112 receives a user ID indicating a user from the receiving unit 111 and an application name indicating an application for which an activation command is given by the user, the identifying unit 112 identifies a function that is not set by the user indicated by the user ID from the functions of the application indicated by the application name in the setting DB 121.

For example, when the receiving unit 111 receives a command for activating an application indicated by an application name "XYZScanV5" from a user indicated by a user ID "U01", the identifying unit 112 identifies this application, for which the activation command is given, as a first application, and refers to the setting DB 121 shown in FIG. 9 so as to identify that a function indicated by a function name "2-dimensional-code read position" in the first application is the function not set by the aforementioned user. In this case, the identifying unit 112 identifies this function based on a first name serving as the name of the unset function in the first application.

The acquiring unit 113 refers to the function DB 122 so as to identify an application (referred to as "second application") having the function identified by the identifying unit 112 and being one of applications that is different from the first application and in which the function is set. The acquiring unit 113 then acquires setting information set for the aforementioned function in the second application. In other words, the acquiring unit 113 acquires setting information for the identified function in the second application different from the first application.

Although the acquiring unit 113 may acquire setting information set by a user different from the user who has activated the first application in the information processing apparatus 1, it is desirable that the acquiring unit 113 acquire setting information, with respect to the second application, set by the user who has activated the first application. Consequently, according to the setting information set in the past by the user who has activated the first application, a setting process is performed on an unset function of the first application for the user, so that the user may obtain consistent settings with regard to the user's preference and habit.

For example, if there are multiple second applications different from the first application, the acquiring unit 113 may make a request to the server apparatus 2 for history information indicating the history of functions of applications that have been activated to the current point by the aforementioned user, and may acquire the history information. Then, based on the acquired history information, the acquiring unit 113 may select one of the multiple second applications and acquire setting information with respect to the selected second application. In this case, the acquiring unit 113 is an example of an acquiring unit that acquires setting information with respect to any of multiple second applications based on the history of functions to be executed by applications.

If the identifying unit 112 is to identify an unset function in the first application in accordance with the first name thereof as the name of the function, the acquiring unit 113 may identify a second name corresponding to the first application from names of functions in the second application, and may acquire setting information for the function indicated by this second name.

A method for identifying the second name corresponding to the first name involves, for example, disintegrating the first name into multiple character strings and using at least one of these character strings. The acquiring unit 113 in this case is an example of an acquiring unit that disintegrates a first name into multiple character strings and identifies a second name corresponding to the first name by using the character strings.

An example of a method for disintegrating the first name into multiple character strings includes performing segmentation in accordance with a morphological analysis. Before the first name is disintegrated into multiple character strings, for example, the first name may undergo normalization by using a dictionary that describes inconsistent spellings. Normalization involves unifying the spelling of a character strings indicating a common concept in a case where the character string is expressed with different spellings.

When the identifying unit 112 identifies the function of the first application and the acquiring unit 113 acquires the setting information for this function in the second application different from the first application, the applying unit 114 rewrites the setting DB 121 so as to apply the aforementioned setting information with respect to the second application to the aforementioned function of the first application. In other words, the applying unit 114 applies the setting information acquired by the acquiring unit 113 to the function of the first application identified by the identifying unit 112.

In a case where there are multiple second applications, the receiving unit 111 may present these second applications and may receive a selection made by the user. For example, the receiving unit 111 shown in FIG. 8 causes the display unit 15 to display the application names of the multiple second applications so as to present the second applications to the user. In this case, the acquiring unit 113 may acquire the setting information with respect to the second application indicated by the selection received by the receiving unit 111.

Operation of Information Processing Apparatus

Figure 10:
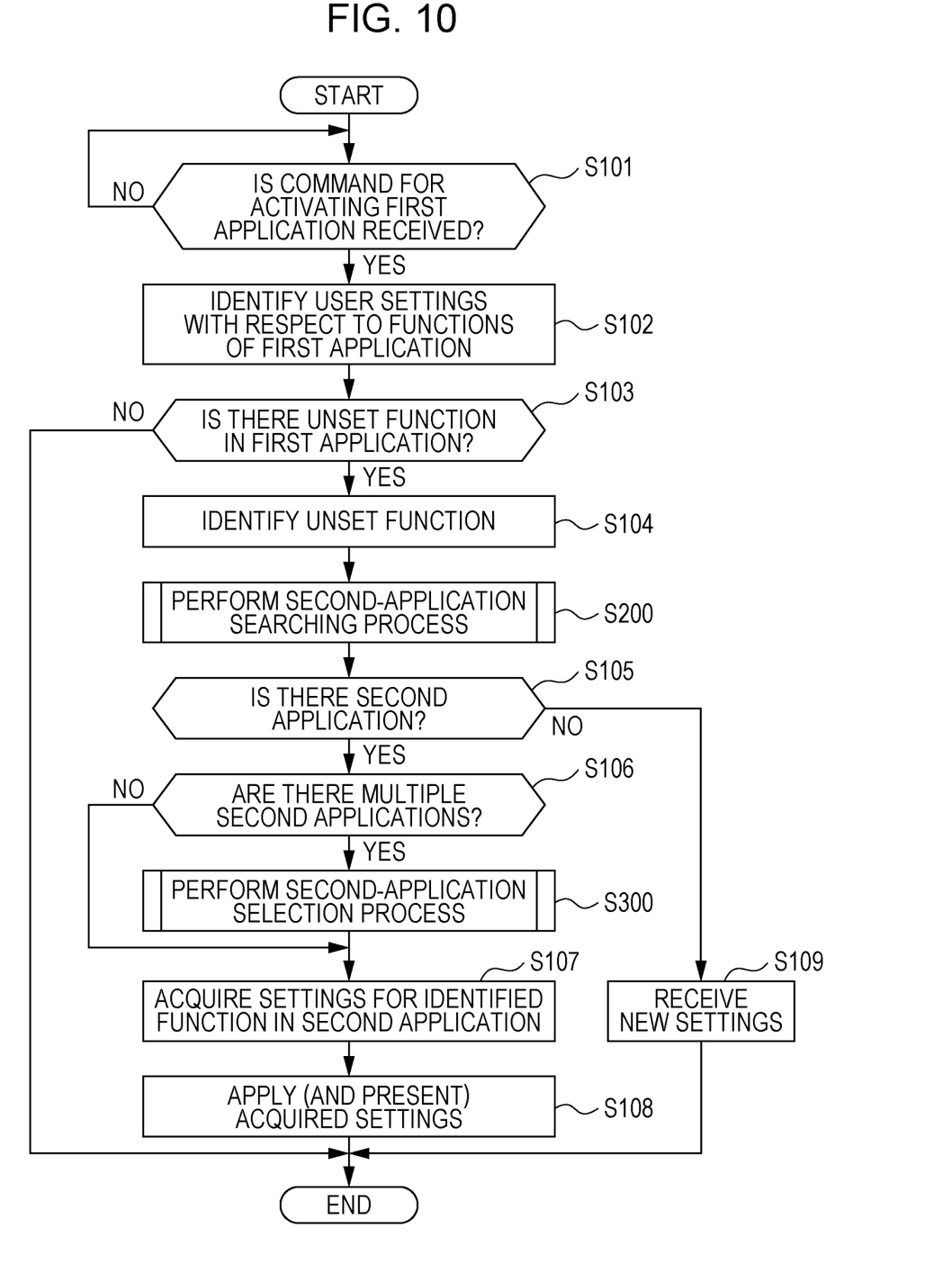
FIG. 10 is a flowchart illustrating the flow of operation of the information processing apparatus.

FIG. 10 is a flowchart illustrating the flow of the operation of each information processing apparatus 1. As shown in FIG. 10, in step S101, the controller 11 of the information processing apparatus 1 determines whether or not a command for activating a first application is received from the operable unit 14. If the controller 11 determines that a command is not received (NO in step S101), the controller 11 continues to perform this determination process.

In contrast, if the controller 11 determines that a command is received (YES in step S101), the controller 11 identifies user settings with respect to the functions of the first application in step S102 and determines whether or not there is an unset function in the first application in step S103.

If the controller 11 determines that there is no unset function in the first application (NO in step S103), the controller 11 ends the process.

In contrast, if the controller 11 determines that there is an unset function in the first application (YES in step S103), the controller 11 identifies the unset function in step S104 and executes a second-application searching process in step S200.

Figure 11:
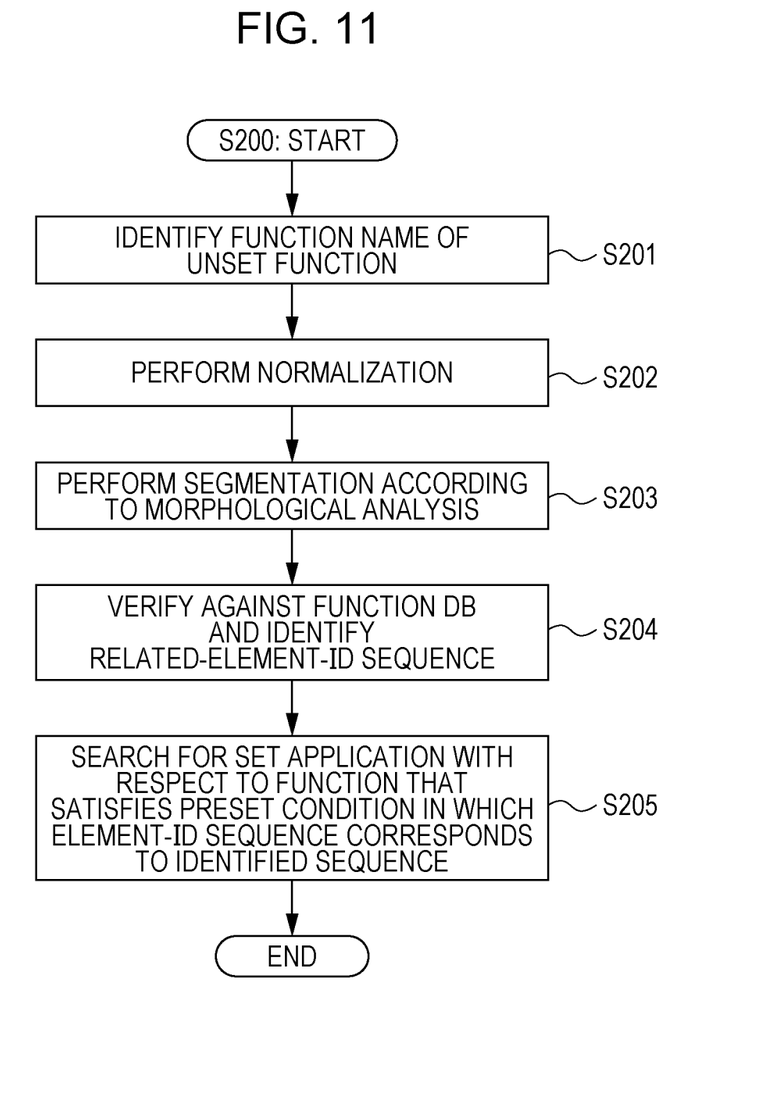
FIG. 11 is a flowchart illustrating the flow of operation of a second-application searching process.

FIG. 11 is a flowchart illustrating the flow of the operation of the second-application searching process performed by the information processing apparatus 1. When the controller 11 identifies a function name indicating the unset function in step S201, the controller 11 normalizes this function name in step S202 by referring to a dictionary that describes inconsistent spellings.

For example, in a case where the controller 11 identifies "2-dimensional-code read position" as a function name indicating the unset function in the first application, that is, a first name, the controller 11 performs normalization and thus replaces the character string "2-dimensional" with a character string "two-dimensional". In a case where the controller 11 identifies "two-dimensional bar-code reading region" as a first name, the controller 11 performs normalization and thus replaces the character string "reading" with a character string "read". As a result of this normalization, the spelling of the identified first name is unified.

In step S203, the controller 11 performs segmentation on the normalized first name in accordance with a morphological analysis. Segmentation involves disintegrating a character string into multiple character strings included in this character string. A morphological-analysis-based segmentation involves disintegrating a character string into multiple morphemes. A morpheme is a minimal unit of an expression having a meaning.

For example, when the character string "two-dimensional-code read position" is obtained as a result of normalization of "2-dimensional-code read position", the controller 11 disintegrates the character string into five morphemes, namely, "two", "dimensional", "code", "read", and "position", in accordance with the morphological analysis.

Moreover, for example, when the character string "two-dimensional bar-code read position" is obtained as a result of normalization of "two-dimensional bar-code reading position", the controller 11 disintegrates the character string into six morphemes, namely, "two", "dimensional", "bar", "code", "read", and "position", in accordance with the morphological analysis.

In step S204, the controller 11 verifies the first-name disintegration result against the function DB 122 so as to identify a sequence of element IDs related to the first name. This verification is performed by comparing an array of one or more disintegrated morphemes with character strings described in the function DB 122.

If the array of morphemes included in the first name corresponds to the character strings described in the function DB 122, the controller 11 identifies element IDs associated with the character strings. The controller 11 identifies element IDs with respect to all morphemes included in the first name, so as to obtain the sequence of element IDs.

For example, in a case where the controller 11 identifies "2-dimensional-code read position" as a first name, the first name becomes "two-dimensional-code read position" by undergoing normalization. The controller 11 disintegrates this first name in accordance with a morphological analysis, and verifies the disintegrated morphemes against the function DB 122 shown in FIG. 7.

According to the function DB 122 shown in FIG. 7, with regard to "two-dimensional-code read position", "two-dimensional-code" corresponds to "F22", "read" corresponds to "F11", "F13", or "F14", and "position" corresponds to "F23".

Therefore, the controller 11 obtains the sequence "F22"→"F11/F13/F14"→"F23" as a sequence of element IDs corresponding to the first name after the aforementioned normalization. In this case, "F11/F13/F14" indicates "F11", "F13", or "F14".

With regard to an application other than the first application, the controller 11 also performs normalization and segmentation on a function name, and identifies the sequence of element IDs for each function of the application.

For example, the aforementioned function name "two-dimensional bar-code reading region" becomes "two-dimensional bar-code read region" by undergoing normalization. According to the function DB 122 shown in FIG. 7, with regard to "two-dimensional bar-code read region", "two-dimensional bar-code" corresponds to "F22", "read" corresponds to "F11", "F13", or "F14", and "region" corresponds to "F23". In other words, the controller 11 obtains the sequence "F22"→"F11/F13/F14"→"F23" as a sequence of element IDs corresponding to the function name "two-dimensional bar-code reading region".

In step S205, the controller 11 searches for a set application with respect to a function that satisfies a preset condition in which the sequence of element IDs identified for each function corresponds to the sequence of element IDs identified in step S204. An application found as a result of this searching process is a second application.

The aforementioned "condition" may be a condition in which the sequence of element IDs is identical from the beginning to the end, or may be a condition in which the sequence of element IDs is identical at a rate that exceeds a preset threshold value. In the case of the above example, the application in which the function indicated by the function name "2-dimensional-code read position" is unset and the application in which the function indicated by the function name "two-dimensional bar-code reading region" is set have the same sequence of element IDs identified from the respective function names. Thus, the controller 11 determines that these applications correspond to each other. Therefore, if the former is defined as a first application, the latter is defined as a second application.

When the searching process in step S200 is completed, the controller 11 determines in step S105 whether or not there is a second application, as shown in FIG. 10.

If it is determined that there is no second application (NO in step S105), the controller 11 receives new user settings in step S109 for the unset function identified in step S104.

In contrast, if it is determined that there is a second application (YES in step S105), the controller 11 determines in step S106 whether or not there are multiple second applications.

If it is determined that there are multiple second applications (YES in step S106), the controller 11 executes a selection process for selecting one of the multiple second applications in step S300.

Figure 12A:
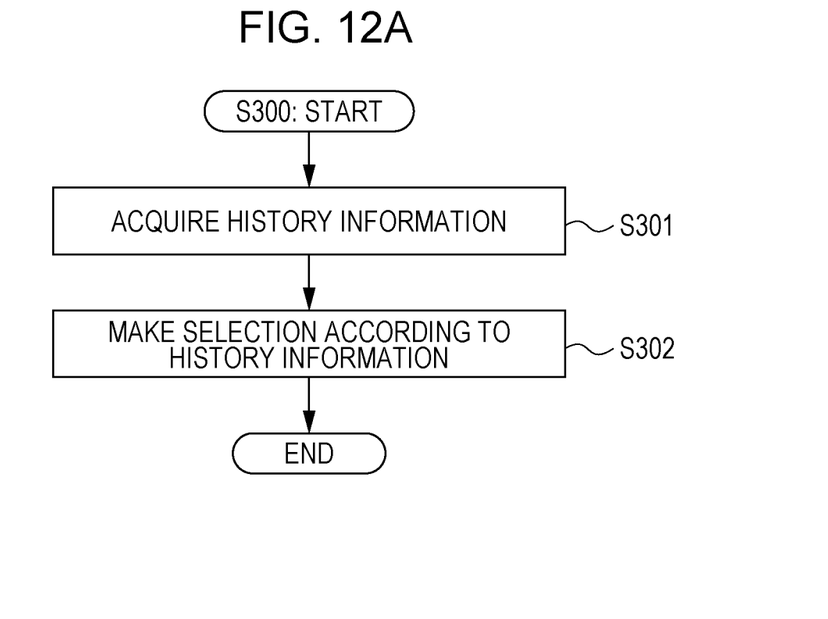
FIGS. 12A and 12B are flowcharts illustrating the flow of operation of a second-application selection process.
Figure 12B:
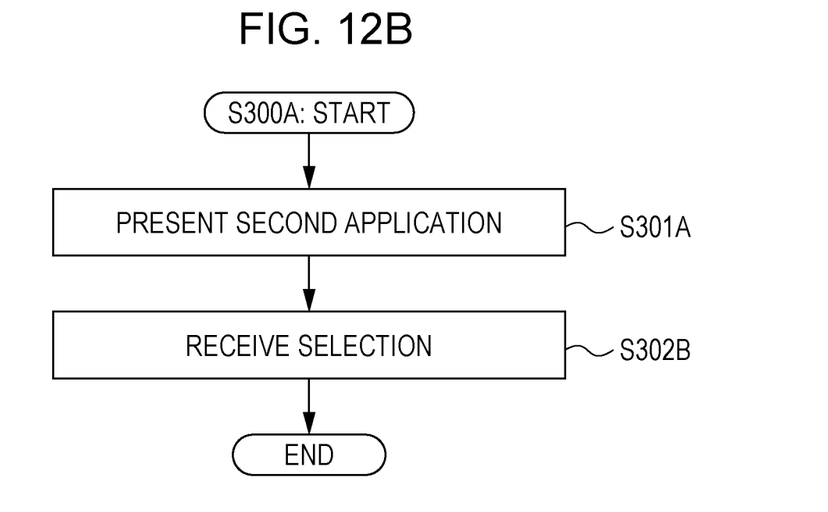

FIGS. 12A and 12B are flowcharts illustrating the flow of the operation of the second-application selection process performed by the information processing apparatus 1.

As shown in FIG. 12A, when it is determined that there are multiple second applications, the controller 11 makes a request for user history information to the server apparatus 2, and acquires the history information from the server apparatus 2 in response to this request in step S301.

In step S302, the controller 11 selects any of the multiple second applications in accordance with the acquired history information. For example, the controller 11 may perform a statistical process by compiling applications and functions executed by the user in accordance with the acquired history information, and may select a second application whose frequency at which the aforementioned function is executed exceeds a threshold value from the multiple second applications. Furthermore, for example, the controller 11 may select a second application in which the aforementioned function is lastly executed from the multiple second applications. The above-described example is the selection process in step S300.

As the second-application selection process, the controller 11 may execute an alternative selection process (step S300A) involving presenting the multiple existing second applications and receiving a user selection, in place of the above-described selection process in step S300.

As shown in FIG. 12B, when it is determined that there are multiple second applications, the controller 11 causes the display unit 15 to display the application names of the multiple second applications, so as to present the second applications to the user in step S301A.

In step S302A, the controller 11 receives a user selection operation performed on the presented second applications. The above-described example is the selection process in step S300A.

After the selection process in step S300 is completed and if it is determined in step S106 that there are no multiple second applications (NO in step S106), the controller 11 acquires, in step S107, setting information for the second application with respect to the unset function identified in step S104.

Then, in step S108, the controller 11 applies the settings indicated in the acquired setting information to the settings for the aforementioned function in the first application. Alternatively, the controller 11 may present to the user that the settings for the function in the second application have been applied to the unset function in the first application.

Figure 13:
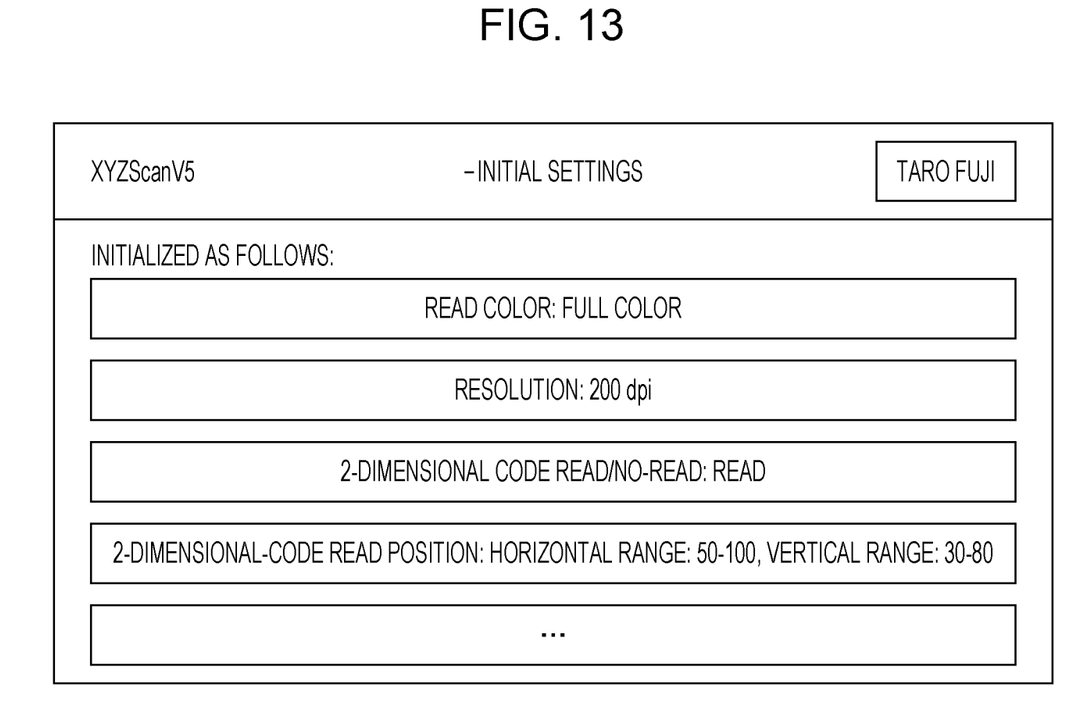
FIG. 13 illustrates an example of display indicating that settings in a different application have been applied.

FIG. 13 illustrates an example of display indicating that the settings in a different application have been applied to the unset function. A screen shown in FIG. 13 is displayed to the user by the display unit 15 of the information processing apparatus 1. In the information processing apparatus 1, an application indicated by an application name "XYZScanV5" is activated as a first application. The controller 11 of the information processing apparatus 1 refers to the setting DB 121 shown in FIG. 9 so as to identify "2-dimensional-code read position" as a function name indicating an unset function of the first application. As described above, the controller 11 identifies the sequence "F22"→"F11/F13/F14"→"F23" as a sequence of element IDs corresponding to this function name.

On the other hand, of applications other than the first application, the function name "two-dimensional bar-code reading region" of the application name "ScanToFTP" and the function name "two-dimensional-code read coordinates" of the application name "ScanToCloud" both correspond to the sequence "F22"→"F11/F13/F14"→"F23" identified as a sequence of corresponding element IDs.

In other words, since these two function names have a correspondence relationship with the function name indicating the aforementioned unset function of the first application, if the application indicated by the application name "XYZScanV5" is activated as a first application, the application indicated by the application name "ScanToFTP" and the application indicated by the application name "ScanToCloud" are both second applications.

Because it is determined that there are multiple second applications relative to the first application, the controller 11 acquires history information from the server apparatus 2 and selects one of the second applications in accordance with the history information. As shown in FIG. 4, the user with the user ID "U01" executes the function mentioned above more frequently from "ScanToCloud" than from "ScanToFTP". Thus, the controller 11 selects the application indicated by the application name "ScanToCloud" as a second application.

As shown in FIG. 6, the controller 11 applies setting information for the function name "two-dimensional-code read coordinates" of the selected application name "ScanToCloud" and by the user "U01" to the settings of the function name "2-dimensional-code read position" of the application name "XYZScanV5" and by the user "U01". As a result, as shown in FIG. 13, the setting information "horizontal range: 50-100, vertical range: 30-80" is set for the previously-unset function.

Figure 14:
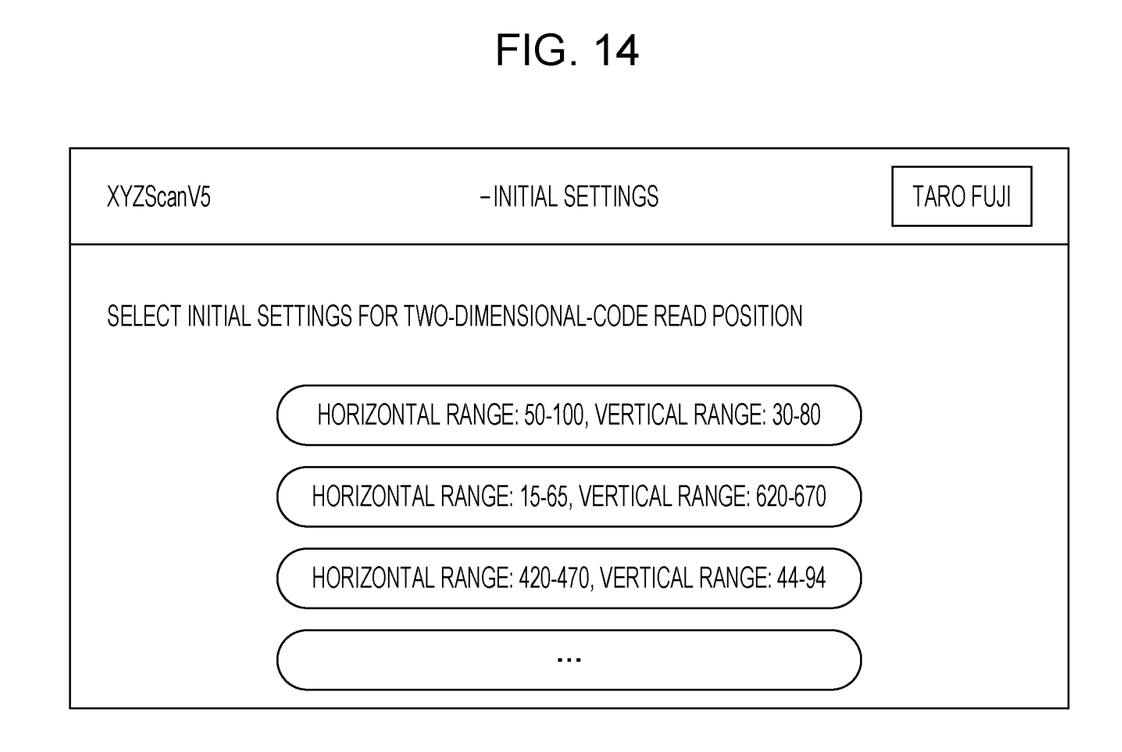
FIG. 14 illustrates an example of display prompting a user to enter new settings to an unset function.

FIG. 14 illustrates an example of display prompting the user to enter new settings to an unset function. If there is no second application corresponding to the first application, the controller 11 of the information processing apparatus 1 determines that there are no settings to be diverted to the unset function in the first application. In this case, the controller 11 displays the screen shown in FIG. 14 so as to prompt the user to enter new settings.

According to the above-described operation, even when there is an unset function in an activated first application, if a function identical to this function is already set in a second application different from the first application, the information processing apparatus 1 acquires setting information for the second application and applies the setting information to the first application. Accordingly, the settings for identical functions are shared between different applications.

In particular, even in applications with the same title, instead of applications with different titles, there may be a function not supported in an older version due to an addition of a new version of the application.

In this information processing apparatus 1, the settings for identical functions are applied not only to applications of different versions, but also to different applications. Therefore, so long as the user has performed a setting operation for the second application in the past, the user does not have to perform an additional setting operation for the first application when the first application is to be activated.

Modifications

Although the exemplary embodiment has been described above, the contents of the above exemplary embodiment may be modified as follows. Moreover, the modifications may be combined.

First Modification

Figure 15:
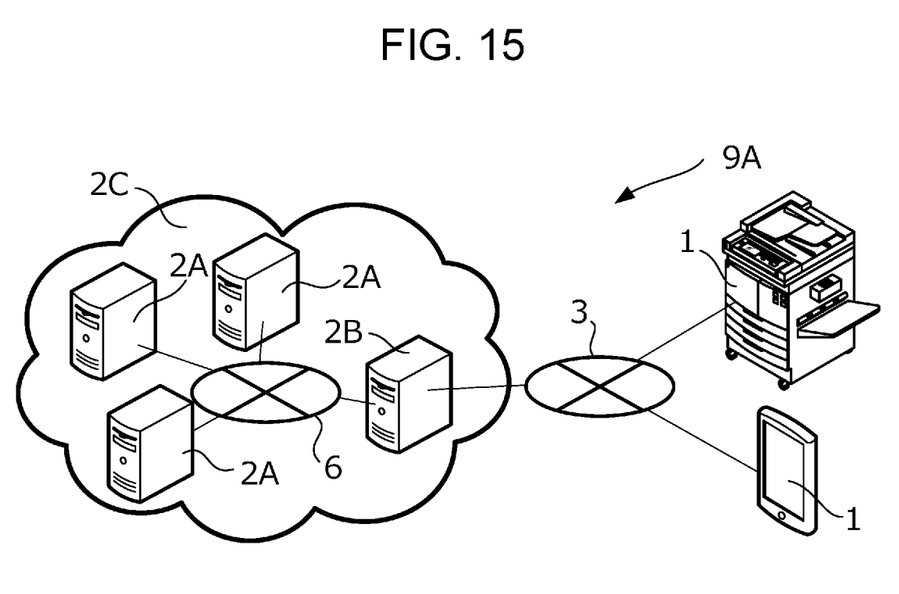
FIG. 15 illustrates the configuration of an information processing system according to a modification.

In the above exemplary embodiment, the information processing system 9 includes the single server apparatus 2. Alternatively, the information processing system 9 may provide a function of the server apparatus 2 in a cloud constituted of multiple server apparatuses 2A.

FIG. 15 illustrates the configuration of an information processing system 9A according to a modification. The information processing system 9A shown in FIG. 15 includes a cloud 2C in place of the single server apparatus 2.

The cloud 2C includes multiple server apparatuses 2A, at least one gateway apparatus 2B, and a second communication line 6 that connects these apparatuses.

The second communication line 6 is a communication line available to the public, such as the Internet. The gateway apparatus 2B establishes a virtual dedicated line, such as a so-called virtual private network (VPN), via the second communication line 6 and serves as a mediator for providing functions of the server apparatuses 2A to a first communication line 3A serving as a LAN.

In this case, even if any of the multiple server apparatuses 2A fails due to trouble, the cloud 2C provides a function equivalent to the server apparatus 2A in the aforementioned information processing system 9A.

In this configuration, when there is an unset function in an activated first application, if a function identical to this function is already set in a second application different from the first application, the information processing apparatus 1 of the information processing system 9A acquires setting information for the second application and applies the setting information to the first application. Therefore, so long as the user has performed a setting operation for the second application in the past, the user does not have to perform an additional setting operation for the first application when the first application is to be activated.

Second Modification

The program executed by the controller 11 of the information processing apparatus 1 may be provided by being stored in a computer readable storage medium including a magnetic storage medium, such as a magnetic tape or a magnetic disk, an optical storage medium, such as an optical disk, a magneto-optical storage medium, and a semiconductor memory. Furthermore, the program may be downloaded via a communication line, such as the Internet. The controller exemplified by the controller 11 described above may be various types of devices other than a CPU. For example, a dedicated processor may be used.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
an identifying unit that identifies an unset function from functions included in an activated first application;
an acquiring unit that acquires setting information for the identified function in a second application different from the first application; and
an applying unit that applies the acquired setting information to the function of the first application,
wherein the identifying unit identifies the function in accordance with a first name as a name of the function in the first application, and
wherein the acquiring unit identifies a second name by disintegrating the first name corresponding to the first name from names of functions in the second application and acquires the setting information for the function indicated by the second name.

2. The information processing apparatus according to claim 1,
wherein the acquiring unit acquires the setting information, in the second application, set by a user who has activated the first application.

3. The information processing apparatus according to claim 2,
wherein the second application includes a plurality of second applications, and
wherein the acquiring unit acquires the setting information in any of the second applications based on a history of a function executed by an application.

4. The information processing apparatus according to claim 1,
wherein the second application includes a plurality of second applications, and
wherein the acquiring unit acquires the setting information in any of the second applications based on a history of a function executed by an application.

5. The information processing apparatus according to claim 1,
wherein the acquiring unit disintegrates the first name into a plurality of character strings and identifies the second name corresponding to the first name by using the character strings.

6. The information processing apparatus according to claim 1, further comprising:
a receiving unit that presents each of second applications in a case where the second application includes a plurality of second applications, and that receives a user selection,
wherein the acquiring unit acquires the setting information in the second application indicated by the received selection.

7. A non-transitory computer readable medium storing a program causing a computer to execute a process for processing information, the process comprising:
identifying an unset function from functions included in an activated first application;
acquiring setting information for the identified function in a second application different from the first application; and applying the acquired setting information to the function of the first application,
wherein the unset function is identified in accordance with a first name as a name of the function in the first application, and
wherein a second name is identified by disintegrating the first name corresponding to the first name from names of functions in the second application and the setting information is acquired for the function indicated by the second name.

8. The non-transitory computer readable medium storing the program causing the computer to execute the process for processing information according to claim 7, the process further comprising
disintegrating the first name into a plurality of character strings and identifying the second name corresponding to the first name by using the character strings.

9. An information processing apparatus comprising:
identifying means for identifying an unset function from functions included in an activated first application;
acquiring means for acquiring setting information for the identified function in a second application different from the first application; and
applying means for applying the acquired setting information to the function of the first application,
wherein the identifying means identifies the function in accordance with a first name as a name of the function in the first application, and
wherein the acquiring means identifies a second name by disintegrating the first name corresponding to the first name from names of functions in the second application and acquires the setting information for the function indicated by the second name.

10. The information processing apparatus according to claim 9,
wherein the acquiring means disintegrates the first name into a plurality of character strings and identifies the second name corresponding to the first name by using the character strings.

\* \* \* \* \*